Feb. 3, 1970

H. E. CAMERON 3,492,905

AUDIO-VISUAL APPARATUS

Filed March 20, 1967

INVENTOR
H.E. CAMERON
by Mason, Mason & Albright
Attorneys

# United States Patent Office 3,492,905
Patented Feb. 3, 1970

3,492,905
AUDIO-VISUAL APPARATUS
Hugh Elliot Cameron, 25 Kitchener St., Port-of-Spain,
Trinidad and Tobago
Filed Mar. 20, 1967, Ser. No. 624,563
Int. Cl. A63j *17/00*
U.S. Cl. 84—464        5 Claims

ABSTRACT OF THE DISCLOSURE

A projection device for displaying various colors and color intensities is associated with a source of music. A plurality of transparent windows with lights have screens movable between them which screens are moved responsive to particular musical notes and elements such as keys, which produce the notes. A player's fingers can be provided with digit gloves with particular magnetic patterns which articulate the screens as a musical instrument is played.

---

The present invention relates to apparatus and in particular to apparatus for use in combination with musical instruments to enable the visual projection of music, as interpreted, in the form of color and light as it is played, and kindred uses such as the making of music scores.

According to the present invention there is provided apparatus suitable for use in combination with a musical instrument enabling the visual projection of music, as interpreted, in the form of color or light and shade as it is made, which comprises means for adapting the instrument to actuate means for illuminating and/or displaying a screen or combination of screens having a visual appearance characteristic of a musical note or notes made by the instrument.

The screen or screens may conveniently be transparent colored, shaded and/or colored patterned or patterned.

Means for illuminating the screen or screens may suitably be an electric lamp or lamps. Alternatively the screen or screens may be displayed by the opening of a shutter or shutters. In practice a combination of both illumination and display means may be employed.

Means for actuating the illumination and/or display of the screen or screens may be electric, electronic and/or electromagnetic means associated with a single or group of sound producing mechanisms on the instruments, which mechanism is in turn caused by its manipulation to actuate the system, in addition to actuating the instrument.

The instrument may be any suitable musical instrument e.g. a wind or string instrument in particular keyed or valve instrument and more especially a keyboard instrument such as a piano, organ or electric organ. As will be appreciated in a keyed or valve instrument the keys or valves constitute the sound producing mechanisms whereas in a string instrument such as a violin where there are no keys, the strings themselves constitute the sound producing mechanisms.

Thus in preferred forms of the invention, each note played is visually denoted by an illuminated combination of screens of which one indicates the octave in which the note occurs for example upper register or lower register and the other indicates the scale position of the note, i.e. C, D, E, F, G, A or B and whether sharp or flat. Moreover, there is also provided a visual indication as to which hand and digit of a player's hands is playing the note.

In one particular embodiment of the invention which finds application with keyed or valve instruments and especially with keyboard instruments such as a piano, by contact with a device or devices associated with the digits of the player's hands, the keys communicate impulses which select the illuminating and/or displaying means to be operated. For example, the player's fingertips may be provided with tip-gloves charged with individual magnetic patterns of powdered iron or iron oxides as is the case with magnetic recording tape and the keys made as sensitive magnetic heads translating into electric impulses the magnetic fields imparted by the fingertip gloves, the electrical impulses selecting and operating the illuminating and/or display means.

In practice associated with the keyboard of the instrument there is provided apparatus having a series of ten windows arranged as an upper row of five windows with the remaining five in a lower row placed in juxtaposition to the intervening spaces between the window above. Each window corresponds to a particular digit of the player's hands, one row of windows representing the left hand and the other row the right. A separate set of screens and separate illuminating and/or display means is associated with each window. Each key on the keyboard is connected to the illuminating and/or display means of each one of the ten windows (the latter corresponding to the ten digits): but according to which digit of the player's hands depresses the key only the particular illuminating and/or display means associated with the digit, by virtue for example of the particular magnetic pattern on the tip-glove, will operate and be visible in the appropriate window.

As indicated above each window corresponds to a digit of the player's hands and is provided with a set of different screens. Each of the ten sets of screens is identical in complement and comprises a series of octave screens each characteristic of a particular octave on the keyboard. Preferably the octave screens are colored, but black, white and shading may also be used. For each particular octave on the keyboard there will be a characteristic color. Thus for an instrument having a compass of six octaves there will be six differently colored octave screens in each of the ten sets. When a note in a particular octave is played, the octave screen of apropriate coler is made visible in the window appropriate to the fingering used. Preferably in order to render the appropriate octave screen visible, it is moved into a visible position in association with the illuminating and/or display means by an electric current operated means actuated by depressing any one of the keys within the scale of the octave associated with that color or shade. For this purpose, all (twelve) keys forming the scale in an octave may be linked by wiring, and each of the similarly colored or shaded screens at the ten windows may likewise also be linked: and both links jointed. But when any one key is depressed only one of the color or shaded screens will be allowed to respond or move into position so as to become visible and this one will be selected or released by the same impulse which operates the illuminating and/or display means.

In addition to the colored or shaded octave screens, the set of screens associated with each window may also comprise pattern screens each bearing an individual pattern characteristic of one of the notes of the scale. Thus the series of seven notes of the octave may be depicted (each note on a separate screen) by a series of signs comprising varying numbers and/or arrangements of vertical lines which may be thick in the case of naturals and thin in the case of sharps for example in the following table:

TABLE

| | Naturals | Sharps |
|---|---|---|
| C | \| | |
| D | \| \| | \| \| |
| E | \| \| \| | |
| F | \| \| \| \| | \| \| \| \| |
| G | \| \ \| \ \| \ \| | |
| A | \| \ \| \| \ \| \| \| | |
| B | \| \| \| | |

Likewise the pattern screens may show a representation of the musical notation corresponding to the note struck by the key. The addition pattern screens are moved into a visible position so as to be superimposed upon the characteristic octave screen simultaneously with the movement of the latter into a visible position. To accomplish this, the keys of similar name in all the octaves may be linked by wiring: and these may in turn be linked by wiring to a similar circuit of all the pattern screens carrying the design of the particular note in each of the ten windows. But only one of these ten pattern screens will be allowed to move into position or otherwise respond to the key played and this one will be selected by the same impulse that selects which of the color/shaded screens is to be displayed or allowed to move into position.

The superimposure of the selected color/shaded screen and pattern screen thus presents a resultant color/shaded design characteristic of the selected note on the keyboard. In addition the duration of the musical note is reflected by the length of time that its characteristic design is revealed. Moreover the depth and cadence of the musical note may be caused by conventional (e.g., sound-photo) means to be reflected in the brightness or dullness of the illumination of the color design. Thus playing of a musical piece on the instrument is accompanied by a continually changing pattern of light shade and color directly linked to the music itself.

In accordance with a further embodiment of the present invention the apparatus may be employed to produce recordings of the visual projection of the music played. That is to say that the continually changing pattern of light shade and color in each window may be photographed on color cine film, or otherwise recorded for example by printing or painting (with or without the aid of the apparatus) on a strip of suitable material e.g. paper, linen-backed paper or cloth. These photographs or recordings may be mechanically fed through the apparatus of the present invention behind and in appropriate alignment with each of the windows, the whole sequence being appropriately synchronized. So, however, that it may be made possible for the changes to be anticipated visually, e.g. through a frosted window before they come fully into play or clear view. The instrument itself may then be played manually by a player, sight reading from the changing color/shaded design. Alternatively the apparatus may be adapted electrically or electronically to play the instrument automatically in response to the films or recordings bearing the patterns of light, shade and color. The apparatus may be further adapted to effect playing of the film or recording and/or the instrument itself at varying speeds and to stop, start, reverse and re-start at will, this being of particular value for teaching purposes. Additionally for teaching purposes the actual keys of the instrument may be colored or covered in colored sheaths characteristic of the particular octaves and may also bear this characteristic design and additionally may be illuminated when played.

For instruments operated by the feet as well as the hands, e.g. organs, additional windows and screens etc., may be provided in the apparatus linked directly to the foot pedals of the instrument but otherwise functioning in an identical manner to that described above.

In the case of stringed instruments, the piece of music is firstly tape-recorded or photo-sound filmed, and then played-back into the visual apparatus.

In the visual apparatus, the windows will correspond to the strings of the instrument, and their illumination and/or display will be actuated during the play-back by currents excited by a separate simultaneously recorded track made directly from identifiable impulses created through the physical use or vibration of each string during play.

Similarly, the color/shaded/pattern designs in each window will be actuated according to the particular recorded patterns or frequencies of the respective notes that were played and recorded on a separate simultaneous track.

In the case of woodwind and brass instruments, the same method as for stringed instruments is employed, namely, that the fingering is recorded directly on to a separate track of a tape-record or photo-sound film by distinctive impulses from the keys as they are played, while simultaneously the music played is recorded on a separate track of the tape or photo-sound film. During parallel play-back the first track selects for illumination and/or display the windows corresponding to the keys played, while the impulses from the distinctive note patterns or frequencies on the other track excite the corresponding color/shaded pattern designs of the notes in the window.

For teaching or other purposes—on instruments in general—each key or position may be illuminated (in the appropriate color and/or design or otherwise) as it is automatically or manually played.

Scores for orchestra may be made by simultaneous recording of the separate instrumental parts, or by synchronization or manually.

Figure 1:
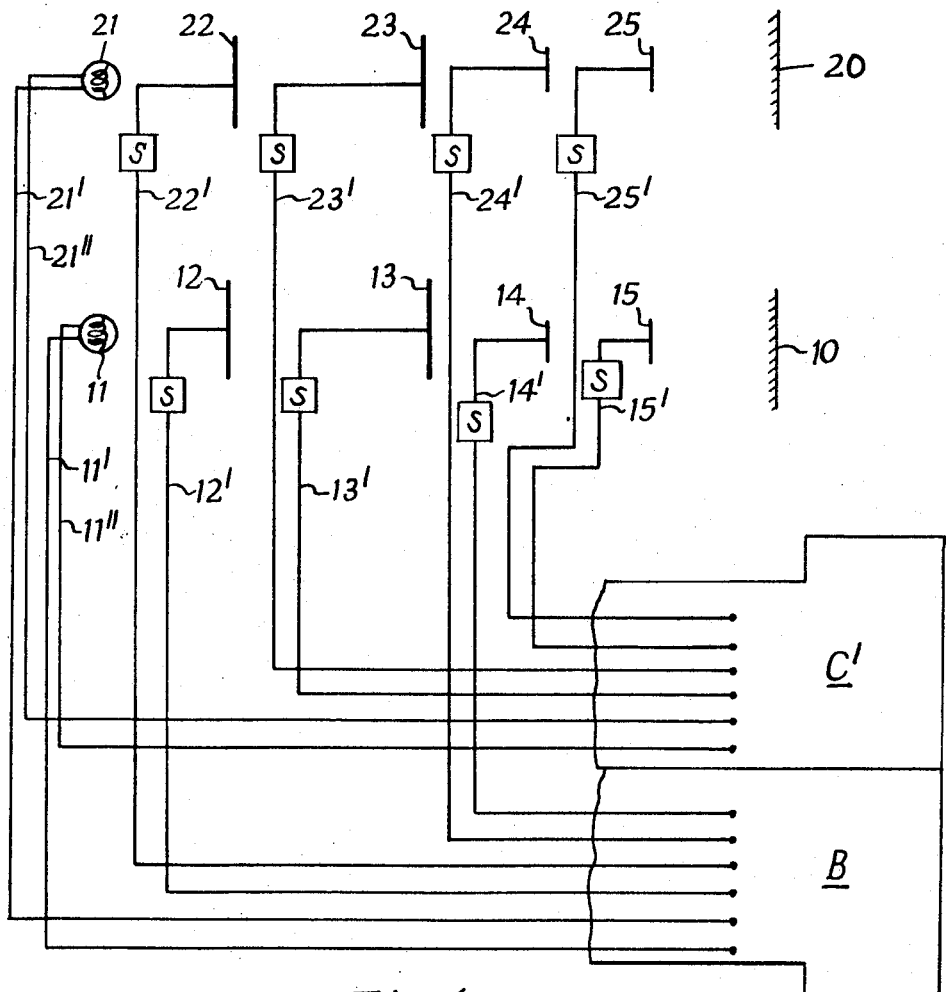
FIGURE 1 is a schematic diagram of the apparatus associated with piano keys.

One form of the invention as used in association with a piano is illustrated in the accompanying drawing FIGURE 1 which is a schematic diagram illustrating a representative portion of the apparatus in association with keys of a piano.

In FIGURE 1 two piano keys are indicated by the references B and C'. An octave on the piano is regarded as a scale extending from a note C through D, E, F, G, A and B, the next octave commencing with an upper C. It will therefore be appreciated that the key B in the drawing is the top note of a lower octave and the adjacent key C' is the lowest note of the next higher octave.

Two windows indicated by the references 10 and 20 are representative of ten windows of the apparatus which correspond to 10 digits of a player's hands. The window 10 corresponds with the thumb of the right hand and the window 20 corresponds with the index finger of the right hand. Three other windows (not shown) are arranged in line with the windows 10 and 20 and correspond to the middle, ring and little finger of the right hand, and a second row of windows (not shown) correspond to the digits of the left hand. Associated with the window 10 is a lamp 11, a transparent, characteristically colored lower octave screen 12, a transparent upper octave screen 13 of characteristic color different from that of the screen 12, a transparent pattern screen 14 having a pattern corresponding to the note B of the scale, and a transparent pattern screen 15 bearing a pattern corresponding to the note C of the scale. Associated with the window 20 is a lamp 21, a lower octave screen 22 of the same color as the screen 12, an upper octave screen 23 of the same color as screen 13, a pattern screen 24 bearing the pattern corresponding to the note B of the scale, and a pattern screen 25 bearing the pattern corresponding to the note C of the scale. Each screen is moved by a solenoid S but for the sake of clarity only one solenoid is shown in the circuit for screen 22 in FIGURE 1.

Figure 2:
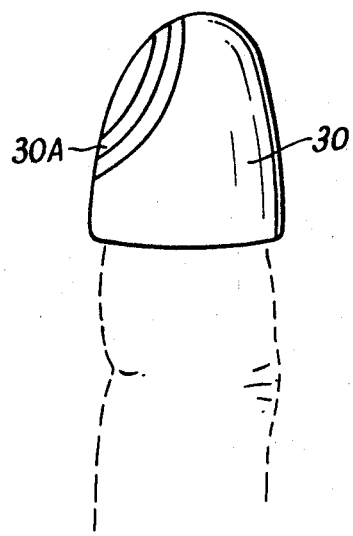
FIGURE 2 is a side view of a digit glove with a magnetic pattern.

All the keys of the piano including the illustrated keys B and C' are constructed as magnetic heads which are sensitive to distinctive magnetic fields imparted by characteristically magnetized fingertip gloves one of which is 30 in FIGURE 2 with a characteristic pattern 30A for that particular digit. A tip 30 is worn on each of a player's fingers. Each of the keys of the piano are thus able to produce characteristic electrical impulses each corresponding to one of a player's fingers provided with the fingertip gloves, the characteristic impulse being used to selectively operate the visual means associated with the window appropriate to the finger used.

The lamp 11 associated with the window 10 is connected to all the keys of the piano and is illuminated whenever any key is played by the thumb of the right hand wearing the appropriate fingertip glove. Similarly the lamp 21 is connected to all the keys of the piano and is illuminated whenever any key is played by the index finger of the right hand. Similarly lamps at the remaining windows are each connected to all the keys of the piano and are illuminated whenever a key is played by the finger appropriate to that window. Thus, as shown in the drawing the lamp 11 is connected to the key B by a conductor 11' and is connected to the key C' by a conductor 11", and the lamp 21 is connected to the key B by a conductor 21' and is connected to the key C' by a conductor 21".

The octave screen 12 is connected to the key B by a conductor 12' and is also connected to all the other keys of the lower octave of which the illustrated key B is the representative top key. The lower octave screen 12 is moved into position in front of the lamp 11 whenever any key of the lower octave is played by the thumb of the right hand and the lower octave screen 22 which is connected to the key B by a conductor 22' is also connected to all the keys of the lower octave and is moved into position in front of the lamp 21 whenever a key of the lower octave is played by the index finger of the right hand.

In a similar manner, the upper octave screen 13 is connected by a conductor 13' to the key C' of the upper octave and is also connected to the remaining keys of the upper octave and is moved into position in front of the lamp 11 whenever a key of the upper octave is played by the thumb of the right hand. The upper octave screen 23 is shown connected to the key C' by a conductor 23' and is connected to the remaining keys of the upper octave in a similar manner.

It will thus be appreciated that the lamps 11 and 21, the lower octave screens 12 and 22 and the upper octave screens 12 and 23 are able to respond in appropriate combination when a particular finger plays a note from a particular octave. The pattern screens 14, 15, 24 and 25 provide the further visual information required as to which particular note of the scale is being played. Thus, the pattern screens 14 and 24 correspond to all the keys representing the note B and in the drawings are shown connected to the key B by conductors 14' and 24' respectively. When any of the notes B are played on the piano, one of the corresponding pattern screens will be moved into position in front of the octave screen appropriate to the octave in which the played note occurs and the lamp of the appropriate window, depending on which finger plays the note. Similarly pattern screens 15 and 25 correspond to all the keys representing the note C and in the drawing are shown connected to the key C' by conductors 15' and 25' respectively. When any of the notes C are played on the piano one of the corresponding pattern screens will be moved into position in front of the appropriate octave screen and lamp depending on which finger plays the note and which octave the note occurs in.

It will be appreciated that a complete set of screens at any window will be made up of octave screens corresponding in number to the number of octaves within the compass of the instrument and of twelve pattern screens correspond to the twelve notes of the scale.

As will be appreciated by those skilled in the art of music the present invention enables the writing or describing of music in a manner to make easy or easier the learning, reading, playing, interpreting and teaching of music by employing wholly automatic and/or partly automatic and/or manual means: the linking of music more closely with the sense of sight and with the qualities of light, shade, color, depth, size and shape: the interpretation of music charts, writings or descriptions by mechanical and/or electrical and/or electronic means: the simultaneous playing, writing and/or visual description or depiction of music: the original fingering for a musical recording or description to be shown or recorded on the music score: the visual projection of music, as interpreted, in form, color, light and shade as it is played: and while it is being played by a person or persons: and a printed photographed or recorded music score to be played automatically.

What I claim is:

1. A projection device for visualizing music comprising in combination:
    (a) a keyboard having a plurality of manually operable keys connected to music producing means,
    (b) at least one light source,
    (c) a transparent window positioned relative to said light source to make visible light emitted by the corresponding source,
    (d) a first information carrying screen movable into the optical path between a window and the corresponding light source by manipulation of a key an selected by the octave of the key,
    (e) a second information-carrying screen movable into the optical path between a window and the corresponding light source by the manipulation of a key and selected by the note of the key.

2. A projection device according to claim 1, wherein each first screen carries a color characteristic of the octave of the key and each second color screen carries a pattern characteristic of the note of the key.

3. A projection device according to claim 2, wherein each light source is energizable by a particular digit of the player.

4. A projection device according to claim 3, wherein ten light sources are provided corresponding to the ten digits of a player's hand.

5. A projection device according to claim 4, wherein a light source is selectively energized by a key carrying magnetic pattern detecting means corresponding to a magnetic pattern on a digit glove.

References Cited

UNITED STATES PATENTS 2,071,044    2/1937    Savage    352—5
1,891,216   12/1932    Hough    84—464

FOREIGN PATENTS 719,560   12/1954    Great Britain.

RICHARD B. WILKINSON, Primary Examiner

LAWRENCE R. FRANKLIN, Assistant Examiner

U.S. Cl. X.R.

88—24; 352—85